S. R. SUTTON.
GANG FISHING HOOKS.
APPLICATION FILED APR. 16, 1908.
913,440.
Patented Feb. 23, 1909.
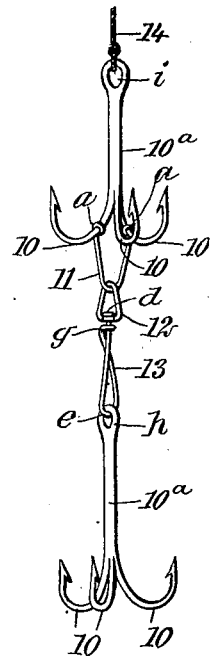
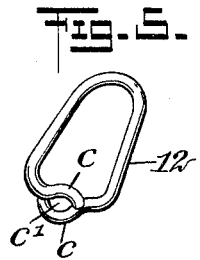
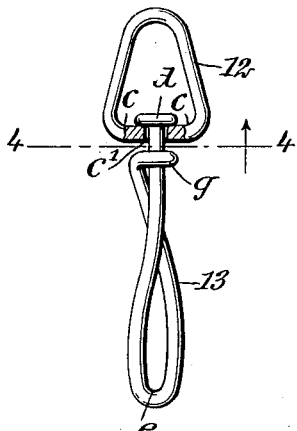
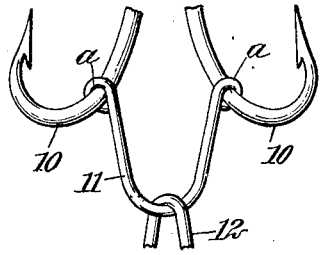
WITNESSES
G. Robert Thomas
Wm. P. Patton
INVENTOR
Scott R. Sutton
BY
ATTORNEYS

UNITED STATES PATENT OFFICE.

SCOTT ROSELLE SUTTON, OF NAPLES, NEW YORK.

GANG FISHING-HOOK.

No. 913,440.  Specification of Letters Patent.  Patented Feb. 23, 1909.

Application filed April 16, 1908. Serial No. 427,307.

*To all whom it may concern:*

Be it known that I, SCOTT R. SUTTON, a citizen of the United States, and a resident of Naples, in the county of Ontario and State of New York, have invented a new and useful Improvement in Gang Fishing-Hooks, of which the following is a full, clear, and exact description.

This invention relates to fishing hooks arranged in groups known as gangs, and has for its object to provide novel, simple and very reliable means for loosely coupling together groups of fishing hooks in sequence, so that they will be free to turn or spin at their coupled connections; and a further object is to provide novel features of construction of an improved swivel link forming a portion of the coupling device.

The invention consists in the novel construction and combination of parts, as is hereinafter described and defined in the appended claims.

Reference is to be had to the accompanying drawings, in which similar characters of reference indicate corresponding parts in all the views.

Figure 1 is a perspective view of the two groups of hooks, coupled together by the improvement and forming a gang; Fig. 2 is an enlarged partly sectional detail view of a feature of the invention; Fig. 3 is an enlarged fragmentary side view of two fishhooks, and a novel coupling for connecting other fishhooks thereto; Fig. 4 is a transverse sectional view on the line 4—4 in Fig. 2, looking in the direction of the arrow, of a swivel link, embodying a feature of the invention, and Fig. 5 is a perspective view of the improved swivel link shown in Fig. 4.

In the drawings that represent the preferred construction of the improvement, two groups of hooks 10, of like form and size, are connected in sequence by the improved means to produce a gang of fishhooks, to be used with a suitable bait or line, not shown, for catching fish. Each group of hooks 10, as represented, is made up of three hooks, all joined upon a single shank $10^a$, and disposed with their barbed points trending upward at an equal distance apart. For effective service, the two groups of hooks 10, shown are so connected in alinement with each other, that the lower group may freely revolve while hanging pendent from the upper one, and to effect such a connection in a simple, inexpensive and reliable manner the improvement has been devised which will be described.

An essentially U-shaped inverted open link 11, is loosely secured at its ends upon two of the upper hooks 10 by ring eyes $a$ that are bent on the ends of the limbs of the link, said ring eyes being formed with openings therein which are closed after said eyes are mounted upon the bowed portions of the hooks. A novel swivel coupling, is introduced between the bail-shaped link 11 and the free end on the shank $10^a$ of the lower group of hooks 10, and is constructed as follows:

An essentially three-cornered ring 12, is formed with an opening in one side member thereof, and to produce said opening in a convenient way and permit the formation of said ring from wire rod, is an important detail of the invention. To this end, the ring 12 is formed of a wire rod of proper length and so bent that the end portions $c$, $c$, of the rod will be equal in length for the formation of one side member of the ring.

As is clearly shown in Figs. 4 and 5, the end portions $c$, $c$ are laterally curved into semi-circular form and then lapped together and secured where they lap, so that a circular opening $c'$ will be formed at the center of this composite member of the ring 12; and as shown in Fig. 2, the bail link 11 and ring 12, are connected together by hooking the link into the ring before its limbs are mounted upon the hooks 10.

A complementary coupling link 13, is loosely attached to the ring 12, by its engagement with the member thereof having the opening $c'$. As shown, the coupling link 13 is formed of wire rod, similar to that from which the other parts 11 and 12 are constructed, and comprises a piece of wire having proper length, and headed at one end as shown at $d$ in Figs. 1 and 2, and the wire is then passed outward through the opening $c'$. Near the center of its length the body of the link 13 is now bent into a loop $e$, and the remaining portion thereof that trends toward the headed end of the rod, is bent into a lateral loop $g$, that is hooked upon and firmly connected with the other member of the link 13.

It should be explained that a perforation $h$ is formed in the flattened end portion of the shank $10^a$, and the return bent member of the link 13 is passed therethrough before the loop $g$ is formed on the end of said member, so that when the latter is clamped upon the link 13 as before stated, the swivel connection between the lower group of hooks 10 and the upper group thereof will be completed, and said lower group of hooks 10 will be adapted to freely rotate or spin on the pendent ring 12.

In the free end of the shank of the upper group of hooks 10, a lateral perforation $i$ is formed, wherein the end of a snell 14, may be secured, and on the snell or any other suitable attachment to the upper group of hooks 10, a lure or bait of any preferred character may be hung, and as this detail is not a feature of the invention, it is omitted from the drawings.

Having thus described my invention, I claim as new and desire to secure by Letters Patent:

1. The combination with a plurality of groups of fish-hooks, each group radiating from a shank, of a swivel loosely engaging the shank of one group, and a link loosely engaged by the swivel and loosely secured to two of the hooks of the other group.

2. The combination with a group of hooks having an integral shank provided with a perforation in its end, of a similar group of hooks, and a swivel connection between the hooks of one group and the shank of the other group, said swivel comprising a link having its ends loosely engaging two of the hooks of one group, a ring loosely engaging the link, and a loop engaging the perforation of the shank of one group and swiveled to the ring.

3. The combination with a plurality of groups of hooks, each having an integral shank perforated near its free end, of a swivel connection between said groups of hooks, comprising a bail-shaped link hung from the hooks of one group, a ring having an opening in its body, and a looped coupling link swivel-connected at one end with the ring through the opening therein, and connected at the looped opposite end with the shank of the other group.

4. In a device of the character described, a swivel-coupling, comprising a bail link having eyes at its ends, a triangular ring having an opening in one of its members, and an elongated coupling link formed with a head on one end, a loop at the other end formed by return bending the material, and a lateral loop at the free end of said return bent portion, which is hooked upon the link body near the head thereon.

5. The combination with two fish hooks, of a bail-shaped link having eyes at its ends engaging one hook, a ring having an opening and loosely engaging the link, and a loop engaging an eye of the shank of the other hook and having one end passed through the eye of the ring and provided with a head.

In testimony whereof I have signed my name to this specification in the presence of two subscribing witnesses.

SCOTT ROSELLE SUTTON.

Witnesses:
WM. C. HANSEL,
J. S. MAXFIELD.